(12) United States Patent
Lokkinen

(10) Patent No.: US 10,085,535 B2
(45) Date of Patent: Oct. 2, 2018

(54) STRAP

(71) Applicant: Innotia Eesti Oü, Tallinn (EE)

(72) Inventor: Mika Lokkinen, Tallinn (EE)

(73) Assignee: Innotia Eesti Oü, Tallinn (EE)

(*) Notice: Subject to any disclaimer, the term of this patent is extended or adjusted under 35 U.S.C. 154(b) by 0 days.

(21) Appl. No.: 15/318,236

(22) PCT Filed: Jun. 9, 2015

(86) PCT No.: PCT/EP2015/062818
§ 371 (c)(1),
(2) Date: Dec. 12, 2016

(87) PCT Pub. No.: WO2015/189192
PCT Pub. Date: Dec. 17, 2015

(65) Prior Publication Data
US 2017/0112251 A1    Apr. 27, 2017

(30) Foreign Application Priority Data

Jun. 13, 2014 (FI) .................................. 20145549

(51) Int. Cl.
*A44B 11/25* (2006.01)
*A44B 17/00* (2006.01)
(Continued)

(52) U.S. Cl.
CPC .............. *A45C 13/30* (2013.01); *F16B 2/08* (2013.01); *A44C 5/2071* (2013.01)

(58) Field of Classification Search
CPC ........ A45C 2013/303; A45C 2013/306; A45C 13/30; Y10T 24/1498; Y10T 24/45225;
(Continued)

(56) References Cited

U.S. PATENT DOCUMENTS 2,708,131 A    5/1955   Snow
3,654,049 A *  4/1972   Ausnit ............... A44B 19/16
                                          138/168

(Continued)

FOREIGN PATENT DOCUMENTS

CN    1216904    5/1999
CN    1406832    4/2003
(Continued)

*Primary Examiner* — Victor D Batson
*Assistant Examiner* — Matthew J Sullivan
(74) *Attorney, Agent, or Firm* — Fasth Law Offices; Rolf Fasth

(57) ABSTRACT

The elastic strap has, at each end, one or more formations, for instance protrusions and notches, which are shaped so as to lock with the formations of the opposite end such that detachment of the ends from one another requires the ends of the strap to be pulled in the longitudinal direction of the strap in mutually opposite directions while stretching the strap. The formations at the ends of the strap, after having been inserted into one another, lock the ends of the strap such that they do not move with respect to one another in directions perpendicular to the unfastening direction or in a direction opposite to the unfastening direction. The strap may be used for ensuring that a suitcase stays closed.

9 Claims, 4 Drawing Sheets

(51) Int. Cl.
*A45C 13/30* (2006.01)
*F16B 2/08* (2006.01)
*A44C 5/20* (2006.01)

(58) Field of Classification Search
CPC ......... Y10T 24/45958; Y10T 24/45984; Y10T 24/45215; A44C 5/2071
See application file for complete search history.

(56) References Cited

U.S. PATENT DOCUMENTS

| | | | |
|---|---|---|---|
| 4,268,559 A * | 5/1981 | Smuckler | B29C 1/10 138/156 |
| 4,578,813 A * | 3/1986 | Ausnit | B65D 33/2541 383/63 |
| 5,197,164 A * | 3/1993 | Meier | A44B 11/22 24/16 PB |
| 5,317,788 A | 6/1994 | Esposito et al. | |
| 5,333,361 A * | 8/1994 | Schaede | A41F 9/007 24/16 PB |
| 7,454,818 B1 | 11/2008 | Backman, III | |
| D734,605 S * | 7/2015 | Van Der Pol | D2/978 |
| 9,382,051 B2 * | 7/2016 | Creato | B65D 85/04 |
| 9,581,972 B1 * | 2/2017 | Arrow | H01M 10/46 |
| 2007/0221461 A1 | 9/2007 | Carmona | |
| 2009/0194210 A1 | 8/2009 | Montross | |
| 2017/0000246 A1 * | 1/2017 | Dent | A45F 5/021 |

FOREIGN PATENT DOCUMENTS

| | | |
|---|---|---|
| DE | 20225000820 | 5/2005 |
| GB | 861265 | 2/1961 |
| GB | 1013380 | 12/1965 |
| GB | 2420586 | 5/2006 |
| WO | 0141602 | 6/2001 |
| WO | 2009034378 | 3/2009 |

* cited by examiner ered and flat, enabling it to extend
STRAP

PRIOR APPLICATIONS

This is a US national phase patent application that claims priority from PCT/EP2015/062818 filed 9 Jun. 2015, that claims priority from Finnish Patent Application No. 20145549, filed 13 Jun. 2014.

BACKGROUND OF THE INVENTION

The invention relates to a strap to be arranged around an object, and particularly the invention relates to a strap tightening around an object on account of elastic properties.

Typically, in order to ensure that packages, boxes and bags to be closed stay closed, straps made of fabric are used that are tightened around the object by means of a buckle. In some models, one end of the strap is provided with a buckle through which the free end of the strap is slipped, and a loop thus formed is tightened up by pulling at the free end of the strap. In the most heavy-duty applications, even a ratchet-type buckle is used in order to be able to tighten the strap properly. In other strap models, both ends of the strap are provided with interlocking buckle parts, and by interconnecting the parts they become locked to one another. In such a case, the length of the loop being formed usually has to be adjusted in advance in order to achieve an appropriate length for the loop.

Sometimes an adhesive tape or a thin plastic film is also used, in which case such material is wound around the object to be closed in an amount that is estimated to suffice. When the object is to be opened again, the tape or plastic film is cut off, making the material unreusable and thus causing waste.

The problem with the above-described arrangement is that the straps are difficult to use. The strap is difficult to tighten up and, on the other hand, it is laborious to unfasten a tightened strap. On the whole, the straps are slow and toilsome to use.

BRIEF DESCRIPTION OF THE INVENTION

An object of the invention is thus to provide a strap so as to enable the aforementioned problems to be solved. The object of the invention is achieved by a strap which is characterised by what is disclosed in the independent claims. Preferred embodiments of the invention are disclosed in the dependent claims.

The idea underlying the invention is that each end of the elastic strap is provided with one or more formations, for instance protrusions and notches, which are shaped so as to lock with the formations of the opposite end such that detachment of the ends from one another requires the ends of the strap to be pulled in the longitudinal direction of the strap in mutually opposite directions while stretching the strap. The formations at the ends of the strap, having been inserted into one another, lock the ends of the strap such that they do not move with respect to one another in directions perpendicular to the unfastening direction nor in a direction opposite to the unfastening direction.

An advantage of the strap according to the invention is that it is easy to use since the strap is fastened by stretching the strap around the object and by pressing the ends against one another. The strap is unfastened by stretching the strap by pulling at its ends and by lifting the ends of the strap off from one another. Another advantage of the strap is that it is reliable to use since the strap cannot become unfastened by accident for instance while the suitcase is being handled at an airport or lying in a cargo hold of an airplane.

BRIEF DESCRIPTION OF THE FIGURES

The invention is now described in closer detail in connection with preferred embodiments and with reference to the accompanying drawings, in which.

DETAILED DESCRIPTION OF THE INVENTION

Figure 1:
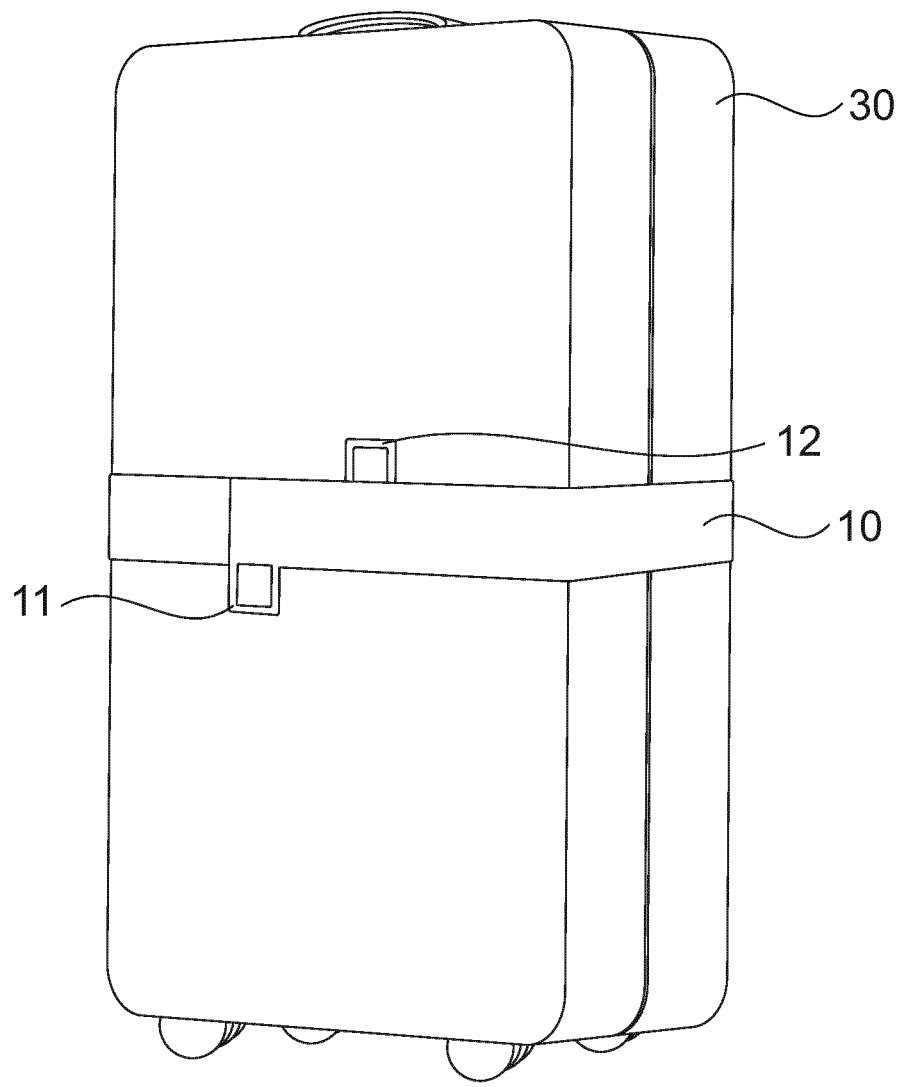
FIG. 1 shows a suitcase having a strap according to an embodiment arranged around it.

FIG. 1 shows an exemplary use situation for a strap 10 according to an embodiment of the invention. An ordinary suitcase 30 to be closed by means of a zipper, buckles or clasps can become unfastened due to the influence of an impact, torque or pressure exerted thereto, which is why it is possible to ensure that the suitcase 30 stays closed by means of the strap 10 according to the embodiment. Preferably, the strap is elongated and flat, enabling it to extend around a suitcase or another object but not to protrude significantly from the surface thereof. The ends of the strap are preferably provided with gripping surfaces or grips 11, 12 with openings for enabling the ends of the strap to be handled more easily. In a preferred embodiment, the grip 11 of a first end protrudes onto a different side of the strap than the grip 12 of a second end, in which case the strap is easy to handle such that the first end is seized by the left hand and the second end by the right hand, or vice versa. In an embodiment, at a lowest-lying end of a strap made into a loop around a suitcase or another object, the grip protrudes onto both sides of the strap, while at a top end, the strap ends in a grip which is provided with an opening and does not differ from the width of the rest of the strap. The grips 11, 12 may be provided with an opening designed for one, two, three or four finger(s) to make them more comfortable to use. In an embodiment, a bar or a tube located at an end of the strap, protruding from one or both side(s) of the strap, may serve as a grip. The grip may be of a material different from the material of the rest of the strap so as to render the grip stronger or thinner than the rest of the strap, for instance.

The strap 10 is at least partly made of an elastic material in order to enable the strap to be stretched and to enable it to be tightened into a loop around an object. In a preferred embodiment, at least a middle part of the strap is of an elastic material. In an embodiment, the ends of the strap at the formations are of a material less elastic than the material of the portion of the strap in between the ends. In an embodiment, the formations at the ends of the strap and the ends of the strap at the formations are not of an elastic material but the middle part of the strap in between these ends is of an elastic material. In an embodiment, the elasticity of a material changes such that the elasticity is at its greatest in the middle of the strap, decreasing towards the ends of the strap. In an embodiment, the strap itself is of an elastic material but the formations at one or two end(s) of the strap are not of an elastic material. In an embodiment the strap is made of a single piece. In a preferred embodiment, the material of the strap has a relatively high friction coefficient. The effect may be emphasized by the design and surface pattern of the strap. The material of the strap may for instance be synthetic rubber, natural rubber, silicone or mixtures thereof, mutually or with other materials. A high friction between the object, for instance a suitcase, and the strap arranged around it helps keeping the strap in place, and the strap does not need to be separately slipped through a handle on a suitcase, for instance, in order to ensure that it will stay in place, as is the case with the fabric straps. A strap with a high friction coefficient with respect to the surface material of the object stays well in place on the surface of the object even if the object grew narrower at the fastening point of the strap and even if the object is being moved and handled.

Figure 2A:
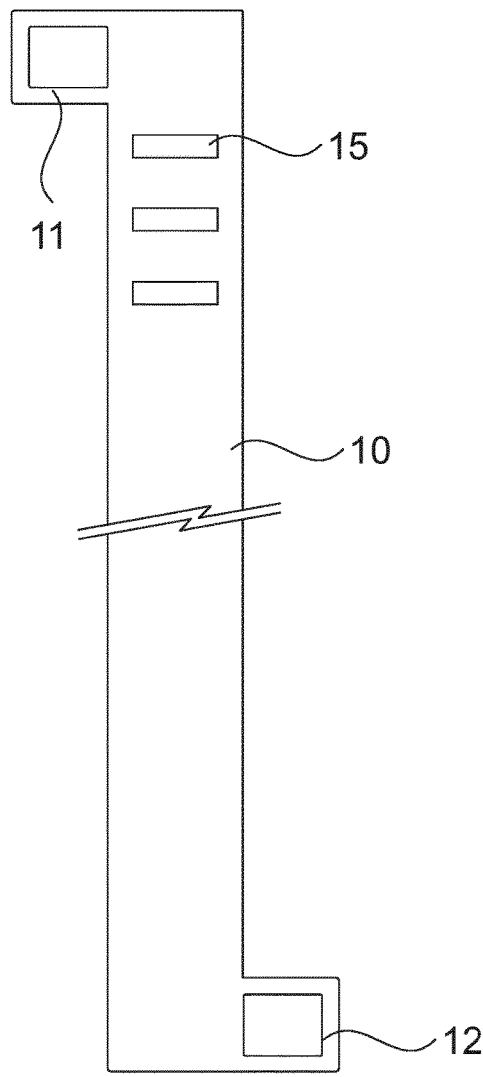
FIGS. 2a and 2b show both sides of a strap according to a first embodiment.
Figure 2B:
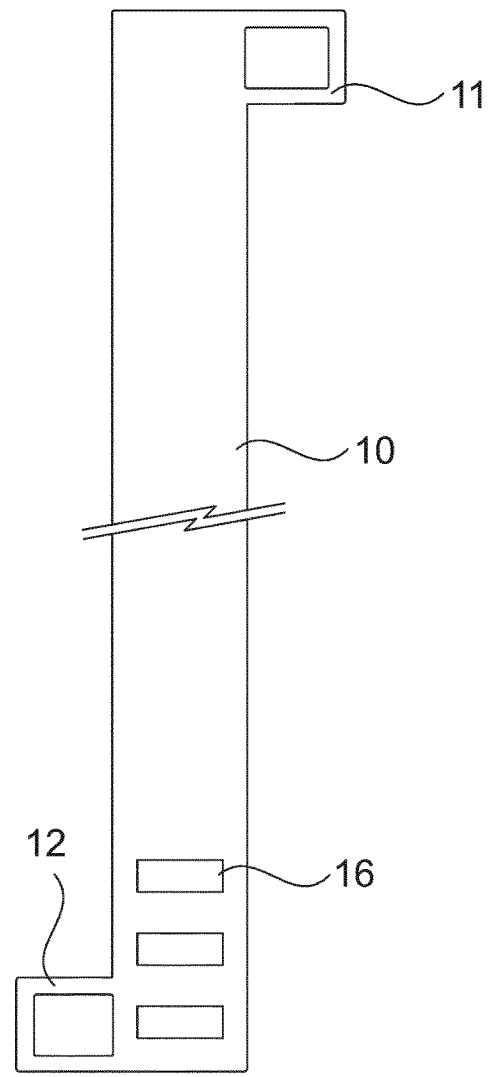

FIGS. 2a and 2b show each side of a strap according to an embodiment. FIG. 2a shows the side which lies against the object around which the strap is made into a loop, while FIG. 2b shows the side of the strap which is not in contact with the object around which the strap is made into a loop. In an embodiment, said sides are the other way around. In FIG. 2a, the grip 11 of the first end of the strap 10 protrudes onto the left-hand side of the strap while the grip 12 of the second end of the strap protrudes onto the right-hand side of the strap. The placement of the grips is to ensure that the grips 11, 12 never lie on top of one another, making them easy to seize. In addition, the grips are spaced apart by the width of the strap, so it is possible to seize the grips in an ergonomic manner when seizing the grips with different hands.

Figure 4:
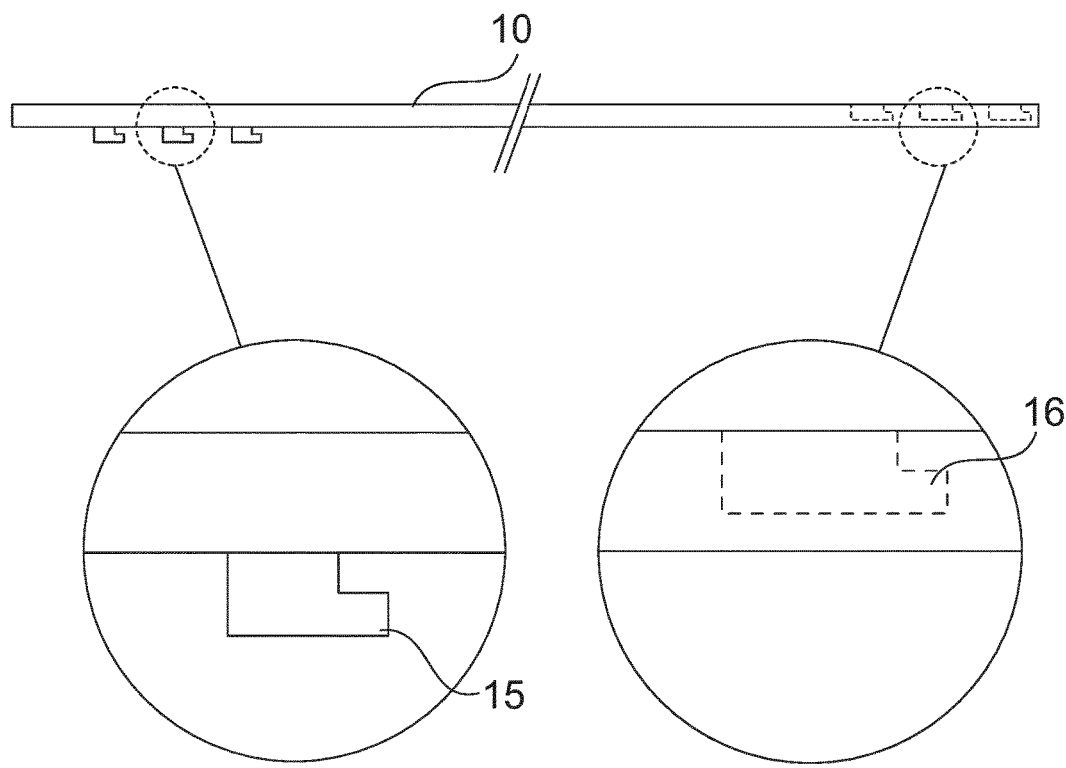
FIG. 4 shows details of formations provided at ends of a strap according to an embodiment.
Figure 5:
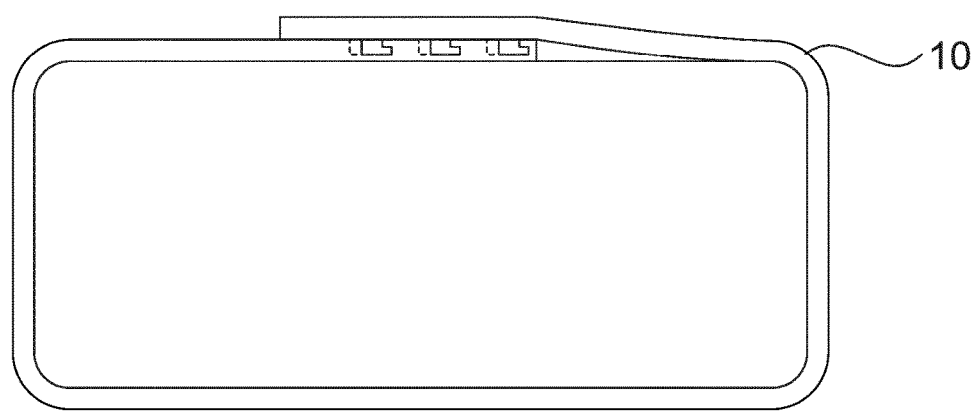
FIG. 5 shows an exemplary cross section of a strap arranged around an object.

FIG. 2a shows formations 15 on one side of the strap while FIG. 2b shows formations 16 on the opposite side of the strap. FIG. 4 shows a side profile of a corresponding strap and enlargements at the formations having the formations 15 of the first end and the formations 16 of the second end designated therein, respectively. FIG. 4 shows in more detail formations 15, 16 according to an embodiment provided at the ends of a strap. Applying the directions given in FIG. 4, the formations 15 of the left-hand end (the first end) of the strap are protrusions having the shape of the letter L, which thus first protrude perpendicularly away from the strap and, at a tail end of the perpendicular part, parallel with the strap, towards the middle part of the strap. The formations 16 of the right-hand end (the second end) of the strap are notches, also having the shape of the letter L, such that the vertical portion is wide enough for the L-shaped protrusions of the left-hand end (the first end) of the strap to be accommodated in the notches. When the strap 10 is made into a loop according to FIG. 5, the right-hand end (FIG. 4) of the strap and the notches 16 formed therein are left pointing outwards from the object around which the strap is wound, and the protrusions 15 of the left-hand end (FIG. 4) of the strap can be inserted into the notches 16 of the right-hand end of the strap in order to enable the strap 10 to be fastened as a loop around the object. As can be seen in FIG. 5, in order to unfasten the loop and to detach the strap 10 from around the object, the end of the strap lying on top has to be pulled in the direction of the figure to the left, and the end located underneath has to be pulled to the right. At least one end has to be kept in place while at the same time pulling at the other end in a direction in which the strap stretches. In addition to this motion to stretch the strap, at the end of the stretching procedure the upper end has to be lifted off from the lower one, the protrusions 15 of the first end only becoming lifted out of the notches 16 of the second end at this stage.

Figure 3A:
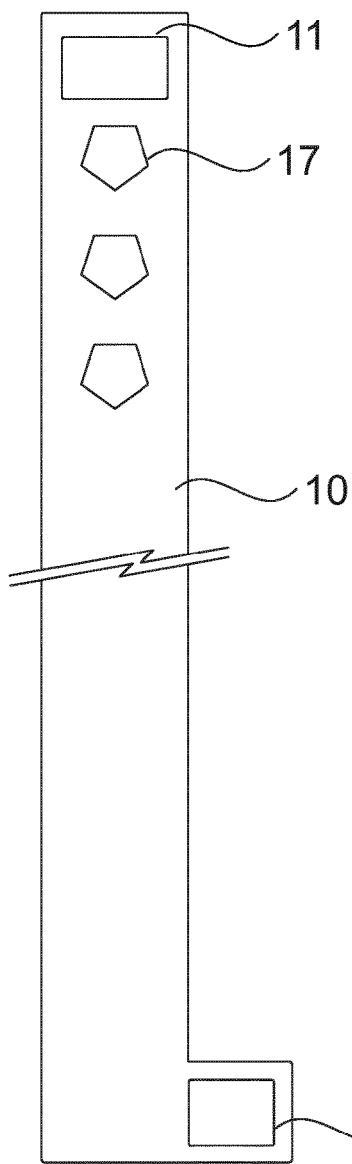
FIGS. 3a and 3b show both sides of a strap according to a second embodiment.
Figure 3B:
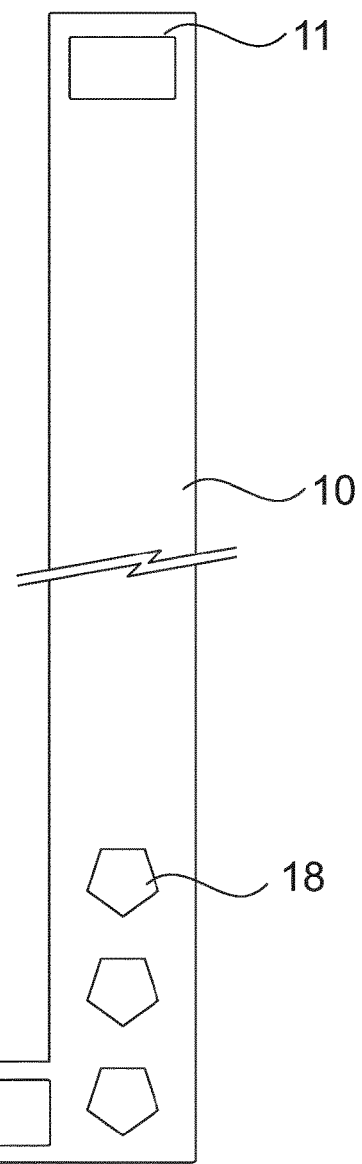

FIGS. 3a and 3b show each side of a strap according to an embodiment. FIG. 3a shows the side which is against the object around which the strap is arranged as a loop while FIG. 3b shows the side of the strap which is not in contact with the object around which the strap is made into a loop. In an embodiment, said sides are the other way around. In FIG. 3a, the grip 11 of the first end of the strap 10 is not wider than the strap, nor does it protrude from the strap but the strap ends in the grip 11. The grip 12 of the second end protrudes onto the left-hand side and the right-hand side of the strap. The placement of the grips is to ensure that the grips 11, 12 never lie on top of one another, making them easy to seize. One of the grips resides in the middle of the strap while the other is provided on both sides of the strap, so the strap is easy to unfasten and fasten for both the right-handed and the left-handed alike.

FIG. 3a shows formations 17 on one side of the strap while FIG. 2b shows formations 18 on an opposite side of the strap. The formations 17 of the strap are pentangular protrusions whose side profile preferably has the shape of the letter L, in which case the protrusions thus first protrude perpendicularly away from the strap and, at the tail end of the perpendicular part, parallel with the strap, towards the middle part of the strap. The formations 18 of the opposite end and side of the strap are notches, also having side profiles in the shape of the letter L, such that the vertical portion is wide enough for the protrusions with the L-shaped side profiles of the first end to be accommodated in the notches.

An aspect of the invention is a strap 10 comprising a first end and a second end as well as therebetween an elastic part enabling the strap to be made into a tight loop around an object. The strap is characterized in that the first end is provided with first surface shapes 15, 17 while the second end is provided with second surface shapes 16, 18, the first 15, 17 and the second 16, 18 surface shapes being at least partly insertable into one another such that said surface shapes become locked in a direction of a force exerted thereto by the elastic part of the strap made into the tight loop as well as in all directions perpendicular to that direction, but not in an opposite direction.

In an embodiment, said interlocked first surface shapes 15, 17 and second surface shapes 16, 18 are arranged to unlock by stretching the strap by pulling at least at its one end and, during the stretching, by pulling the ends of the strap apart from one another, said first surface shapes 15, 17 and second surface shapes 16, 18 thus being separated from one another.

In an embodiment, the first surface shapes 15, 17 of the strap are protrusions from the strap, their side profile having the shape of the letter L, while the second surface shapes 16, 18 of the strap are notches in the strap, their side profile having the shape of the letter L. In an embodiment, the first surface shapes 15, 17 of the strap protrude first perpendicularly away from the strap and, at the tail end of the part perpendicular to the strap, parallel with the strap, towards the middle part of the strap when the strap is lying straight.

In an embodiment, the strap 10 comprises a grip 11, 12 in connection with each end of the strap.

In an embodiment, the strap 10 comprises natural rubber, synthetic rubber or silicone. In an embodiment, the strap 10 is made of natural rubber, synthetic rubber or silicone. In an embodiment, the strap 10 is made more elastic in the middle of the strap than at the ends of the strap.

In an embodiment, the strap 10 comprises means for individualizing the strap. The strap may be provided for instance with a uniform area, frame, studs, aperture or another formation for attaching for instance a logo, business card, airline bonus card or other visual material to the strap for the purpose of individualizing the strap. Such individualization may also refer to a strap designated for advertising purposes, in which case an advertisement or for instance a name, message or trademark of a manufacturer, retail dealer or customer may be attached to said means or provided therein already during the manufacture thereof.

An aspect of the invention is a use of any embodiment of said strap or a combination thereof for ensuring that a suitcase 30 stays closed. Preferably, the strap is used for this purpose by winding the strap around the suitcase and fastening the ends of the strap to one another, in which case the strap forms a tight loop around the suitcase and thus prevents the suitcase from opening even if the suitcase's own closing arrangement were damaged.

The straps according to the embodiments of the invention may be manufactured for instance by moulding, preferably by injection moulding. The material used may be varied during the moulding process flexibly while moulding such that a harder mixture is used at the ends of the strap while a more elastic mixture is used in the middle part of the strap.

It will be apparent to a person skilled in the art that as technology advances, the basic idea of the invention may be implemented in many different ways. The invention and its embodiments are thus not restricted to the examples described above but may vary within the scope of the claims.

While the present invention has been described in accordance with preferred compositions and embodiments, it is to be understood that certain substitutions and alterations may be made thereto without departing from the spirit and scope of the following claims.

I claim:

1. A strap looped around an object, comprising:
a first end and a second end as well as an elastic part disposed therebetween enabling the strap to be made into a tight loop around the object, the strap having an upside surface facing away from the object and a downside surface facing towards the object when looped around the object, the first end being provided with first surface shapes disposed on the downside surface and the second end being provided with second surface shapes disposed on the upside surface of the strap,
the first surface shapes and the second surface shapes being at least partly insertable into one another such that said surface shapes become locked in a direction of a force exerted thereto by the elastic part of the strap made into the tight loop as well as in all directions perpendicular to that direction, but not in an opposite direction, wherein the strap is more elastic in a middle of the strap than at ends of the strap,
the first surface shapes protruding from the strap, the first surface shapes having a side profile having a shape of a letter L that has a lip protruding towards the second end of the strap,
the second surface shapes being notches in the strap, the second surface shapes having a side profile having a shape of the letter L so that the notches have a channel defined therein extending towards the second end of the strap adapted to receive the lip of the first surface shapes, and the first surface shapes being detachable from the second surface shapes by pulling the first and second ends in a longitudinal direction of the strap away from one another while stretching the strap.

2. A strap as claimed in claim 1, wherein said interlocked first surface shapes and second surface shapes are arranged to unlock by stretching the strap by pulling at least at one end of the strap and, during the stretching, by pulling the ends of the strap apart from one another, said first surface shapes and second surface shapes being separated from one another.

3. A strap as claimed in claim 1 wherein the first surface shapes of the strap protrude first perpendicularly away from the strap and, at a tail end of the part perpendicular to the strap, parallel with the strap, towards a middle part of the strap when the strap is lying straight.

4. A strap as claimed in claim 1 wherein the strap comprises a grip in connection with each end of the strap.

5. A strap as claimed in claim 1 wherein the strap comprises natural rubber, synthetic rubber or silicone.

6. A strap as claimed claim 1 wherein the strap is made of natural rubber, synthetic rubber or silicone.

7. A strap as claimed in claim 1 wherein the strap comprises a uniform area for individualizing the strap.

8. A method of using the strap according to claim 1 for ensuring that a suitcase stays closed.

9. A strap according to claim 3 wherein the first and second ends are made of a hard mixture while an elastic mixture is used in the middle part of the strap.

* * * * *